July 1, 1941.  G. E. NERNEY  2,247,639
OPHTHALMIC MOUNTING
Filed Aug. 15, 1938  2 Sheets-Sheet 1
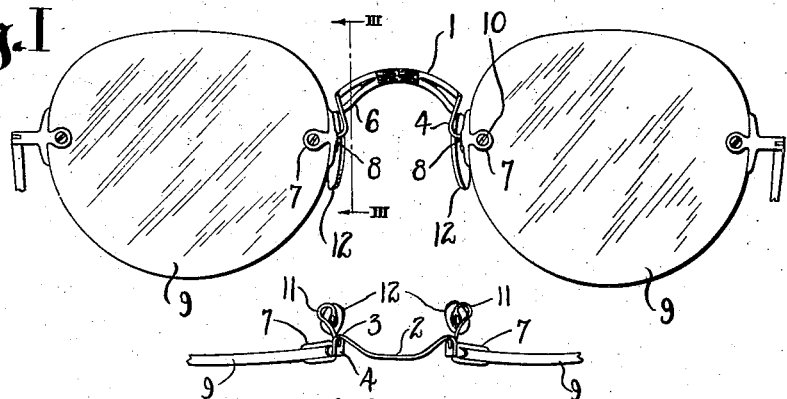
Fig. I
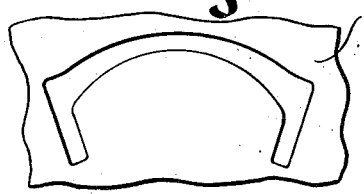
Fig. II
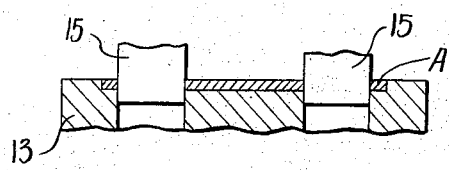
Fig. III  Fig. IV  Fig. V
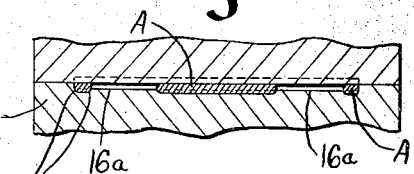
Fig. VI  Fig. VII
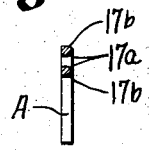
Fig. IX
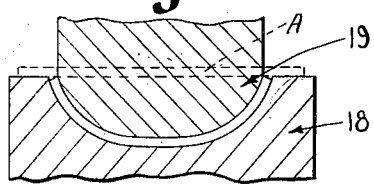
Fig. VIII
Fig. X
INVENTOR.
GEORGE E. NERNEY
BY Harry H. Styll
ATTORNEY.

July 1, 1941. G. E. NERNEY 2,247,639
OPHTHALMIC MOUNTING
Filed Aug. 15, 1938 2 Sheets-Sheet 2
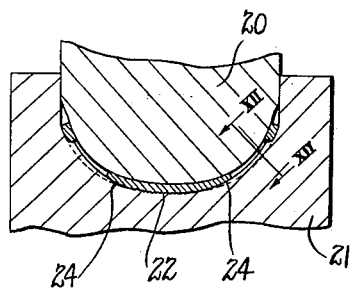
Fig. XI
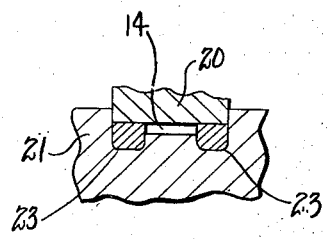
Fig. XII
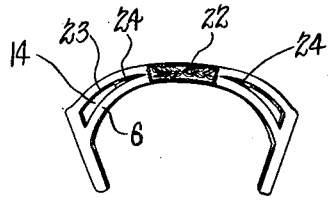
Fig. XIII
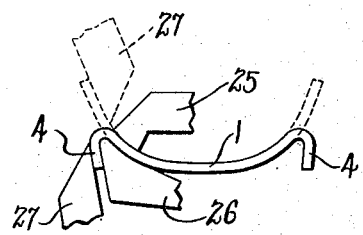
Fig. XIV
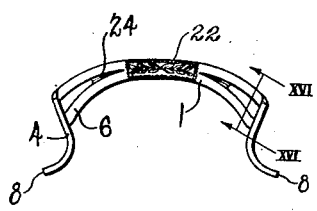
Fig. XV
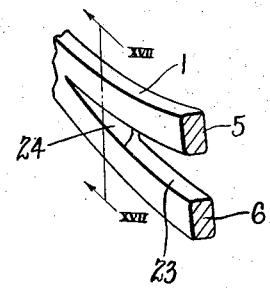
Fig. XVI
Fig. XVII
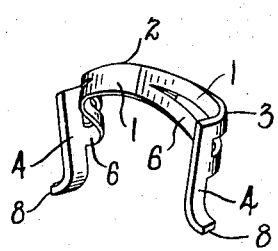
Fig. XVIII
INVENTOR.
GEORGE E. NERNEY
BY Harry H. Styll
ATTORNEY.

Patented July 1, 1941

2,247,639

UNITED STATES PATENT OFFICE 2,247,639

OPHTHALMIC MOUNTING

George E. Nerney, Attleboro, Mass., assignor to American Optical Company, Southbridge, Mass., a voluntary association of Massachusetts Application August 15, 1938, Serial No. 224,872

3 Claims. (Cl. 88—43)

This invention relates to improvements in bridges or like lens connecting means for ophthalmic mountings.

One of the principal objects of the invention is to provide in a structure of this nature a combination of parts and arrangement thereof to obtain the various advantages requisite in a device of this character and to overcome the disadvantages inherent in the problem of fitting such articles to various facial requirements and at the same time obtain an appealing appearance of design so necessary in an article that is to be worn on the face.

Lens connecting means are required to ease off the strain of use on the lenses so as to minimize breakage, and therefore a certain amount of flexibility or flex action is essential. Nevertheless the lens connecting means must provide adequate stiffness, once it has been adjusted by the fitter, so as to maintain the alignment of the parts including the lenses; and at the same time it must bridge the nose without chafing or bringing enough pressure to bear on some part of the nose to cause discomfort.

A light bridge tends toward the requisite flexibility. At the same time it gives an attractive appearance. Furthermore, it is economical of metal, which is an important consideration in articles which are often made of gold. The problem in a light bridge is to obtain adequate bracing so that the parts extending therefrom will be maintained in proper alignment.

The type of bridge sometimes known in the art as a "wrap around" bridge is a desirable type, and popular because it enhances the appearance when worn on faces with noses of certain shapes and proportions. The "wrap around" bridge is bowed forwardly over the bridge of the nose; or from another point of view it recedes progressively on both sides from its center, following the arch of the nose, so as to sweep back from the plane of the lenses. This tends to give a narrowing appearance, which is attractive when the bridge is worn on these faces.

An important object of this invention is to provide a construction which combines lightness with adequate bracing in a type of device which recedes or sweeps back following the arch of the nose.

Other objects and advantages of the invention are to obtain in a composite structure the ability to obtain a desirable fore and aft spring or flexure or flex action, to provide adequate bracing adjacent the point of juncture between the horizontal and vertical members, to provide maximum space for the nose and to allow for the use of larger lenses, and to provide a new combination of parts and their arrangement with a pleasing appearance.

Other objects and advantages of the invention will appear from the following description taken in connection with the accompanying drawings. It is clear that many modifications in the details of construction and arrangement of parts may be made without departing from the invention as set forth in the accompanying claims. The preferred forms and arrangements are set forth and described by way of illustration only, hence I do not wish to be limited other than set forth in the said claims.

Referring to the drawings:

Figure I is a front view of a spectacle embodying the invention;

Figure II is a fragmentary plan view of the central portion of the spectacle shown in Figure I;

Figure III is a detail sectional view on the line III—III of Figure I;

Figure IV shows a fragment of a sheet of material from which the bridge has been blanked;

Figure V is a bridge blank showing one step in the process of making;

Figure VI shows another step of the process and illustrates the piercing of the blank by spaced plungers in a former or die member, the latter being shown in section;

Figure VII is a plan view showing the bridge blank after it has been thus pierced;

Figure VIII is a view showing in section a formed die used in the step in the process of rounding the edges of one side of the pierced portion of the blank;

Figure IX is a detail sectional view showing the rounded edges of the pierced portion;

Figure X is a cross section through dies used for bending the bridge blanks;

Figure XI is a cross section through engraving dies used for extending a depression from the pierced section of the bridge blank;

Figure XII is a detail sectional view on the line XII—XII of Figure XI showing the rounded edges of the die for reshaping the pierced portions of the bridge blank, the section being on an enlarged scale;

Figure XIII shows the bridge blank after it has been struck by the engraving dies;

Figure XIV is a diagrammatic view illustrating the step of bending the ends of the bridge blank;

Figure XV shows the bridge blank after the ends have been bent out;

Figure XVI is an enlarged partial perspective of a portion of the finished bridge blank showing the pierced portion in section;

Figure XVII is cross section on line XVII—XVII of Figure XVI showing the partial indenture adjacent the pierced portion of the bridge blank; and Figure XVIII is a perspective view of a finished bridge with the engraving omitted.

It is recognized in the art that while a bridge for an ophthalmic mounting is apparently a very small and a very simple thing from one's first observation, yet the production of a bridge combining all of the features necessary to overcome the disadvantages, as well as presenting a pleasing appearance on the face, is indeed a most difficult task. This becomes immediately apparent if an analysis is made of the various difficulties to be overcome caused by the small size and space at the designer's disposal and also by the various differences of facial characteristics of the wearers; moreover it is well borne out by the exceedingly great number of bridges that have been designed and have become obsolete. It is therefore the principal object of the invention to provide such a combination as to overcome the disadvantages of earlier types of bridges, and at the same time to obtain certain structural advantages together with a pleasing appearance.

In the past bridges have mostly had the metal disposed in one plane, namely the plane of the lenses. This required either an undue thickness or an undue amount of material to overcome a too facile flexing normal to the said plane. It also made the depending portions too wide, giving the bridge the appearance of great width and cutting down the space for the nose.

In the construction of the invention the end portions have been disposed in a plane normal to the plane of the lenses, giving increased rigidity and also giving increased space for the nose. In doing so, I have provided such a construction of the jointure of the horizontal and depending portions as to afford adequately bracing against displacement by up and down forces in the plane of the lenses. The various objects have been obtained by providing in the one structure a combination of elements or parts to take care of each, and this has been done after careful consideration of all the requirements of such an article.

Referring to the drawings wherein similar characters refer to similar parts throughout, the bridge member itself as an article of manufacture comprises the central or bridge portion 1 disposed substantially in the plane of the lenses (see Figure II) and bent or arched at 2, (see Figures II and XVIII) to fit over the nose; and depending portions or legs 4. As the bridge portion 1 recedes progressively on each side of the nose, it divides as it approaches the reverse bend 3 from which the legs 4 extend forwardly normal to the plane of the lenses. Thus a brace 6 diverges downwardly from the bridge portion 1 to form an under brace in the angle between the portion 1 and the adjacent leg 4 and the brace 5, Fig. XVI, forms an upper brace. The braces 6 join the rear edges of the forwardly extending portions 4 (see Figures II and XVIII) at a point below the arch of the bridge portion 1.

The braces 6 strengthen and stiffen the depending portions 4 against displacement. They also stiffen the structure against displacement upwardly and downwardly in the plane of the lenses.

The depending portions or legs 4 having their material disposed normal to the general plane of the bridge portion 1 stiffen the structure against flexure in a direction normal to the portion 1. The legs 4 having only their thickness disposed between the lenses provide maximum width for the nose space. The legs 4 being wide in a plane normal to the lenses afford maximum surface for connection to the lens straps.

As shown in Figure I, only the ends of the legs 4 are secured at 8 to the lens holding means 7. Accordingly the spacing between the lenses can be varied slightly, according to how much the lower ends of the depending portions or legs 4 are bent outwardly or spread apart. The ends of the legs 4 may be secured to the lens holding means, such as the straps 7 shown, by solder or otherwise.

The lenses 9 are held in place in the lens straps 7 by any suitable means such as the lens screws 10. The guard arms 11 may if desired be secured to the lens straps 7, extending rearwardly to support the guards 12 in the usual manner.

The process of making this bridge member is what is termed in the art as a blanking out process. The bridge blank A is blanked out of a sheet of material S by blanking dies. (See Figures IV and V.) The blank A is then placed in a die member 13 and pierced by spaced plungers 15, Figure VI. This forms the kerfs 14 shown in Figure VII. The blank A thus formed is placed in a formed die 16, Figure VIII, which has raised portions 16a which in shape follow the contour of the kerfs 14 and fit within these openings 14 in the blank A. The curved fillets 17 of the portions 16a round the edges 17a at the back of the openings 14 of the bridge blank A. The side walls of the recesses of the die 16 are also provided with curved fillets to round the outer edges at the back of the blank A as shown at 17b in Figure IX.

The blank A is then placed in the dies 18 and 19 to bend the blank from the dotted line position to the full line position as shown in Figure X. It will be noted that the rounded edges 17a and 17b are now on the back or concave side of the bridge blank.

The blank is now ready for a similar rounding of the edges at the front of the blank. This may be accomplished at the same time as any engraving which is to be done. For this purpose I employ the dies 20 and 21 which are of a character to form not only the central engraving 22 on the bridge, but also to round the front edges of the blank as at 23 and to extend the openings 14 towards this engraving. This extension 24 of the opening 14 does not go all the way through the blank but is indented therein. (See Figures XIII, XVI and XVII.) This gives the appearance of a larger opening without reducing the strength. The bridge may be either plain or engraved as desired. Engraving is indicated at 22 in Figure XIII. The indentation 24, Figure XVI, tapers towards the center of the bridge, decreasing in depth inwardly. The rounded edges 23 of the opening 14 blend into this taper. In the finished bridge the edges are rounded both back and front.

The depending portions or legs 4 are next bent forward normal to the plane of the lenses by placing the formed blank between the clamping jaws 25 and 26, Figure XIV, and reshaping the portions 4 by a suitable turning tool 27 which is pivoted to be rotated from the position illustrated in dotted lines, Figure XIV, to the position illustrated in full lines, thereby bending over the end 4.

Among the new and important steps in the process are those of rounding the edges of the openings 14, and extending the tapered indent in such fashion as to blend into the openings 14. Moreover there is sufficient working of the metal during the blanking out or piercing of the openings 14 and the rounding of the edges and shaping of the indent 24 to stiffen the bridge portion 1 and properly control its flexing characteristics.

For attaching the ends of the legs 4 to the straps as at 8 these ends may be bent as desired (see Figure XV) to regulate the distance for the nose, etc. This has the advantage of allowing one bridge to be used for a number of different distances between lenses, thus accommodating requirements for various individuals.

It will be noted from Figure XVIII that the braces 6 do not make a tight bend at 3. This reverse curve can be made somewhat less gradual so as to impart more crest angle to the bridge, and also if desired to raise the center of the bridge. The ability to manipulate the bends at 3 and also to increase or decrease the arch at 2 gives facility to the fitter in adjusting the bridge member and fitting the ophthalmic mounting to the face of the wearer.

Since the depending portions 4 have their thickness disposed normal to the plane of the lenses, they appear to be of very light weight, blending into the general contour of the bridge with a graceful appearance, and giving a narrower appearance to the whole bridge which is exceedingly desirable.

The bowing forward of the central portion at 2 together with the reverse bends 3 make it possible for the legs 4 to lie substantially in the plane of the lenses, for the bridge portion 1 to arch over the nose, and yet for the bridge as a whole to have the pleasing appearance and the desirable fitting qualities of a "wrap around" type of bridge.

From the foregoing it will be seen that there has been provided a combination of features of a simple and economical combination well adapted to obtain all the objects and advantages of the invention and to overcome disadvantages of prior construction.

Having described my invention I claim:

1. An ophthalmic mounting comprising a pair of lens holding members connected by a bridge member, said bridge member having a central arch portion and relatively long and slender depending side portions all initially formed of sheet-like material, said central arch portion being bowed and having its ends and relatively long and slender depending side portions folded forwardly with a single bend to provide integrally angled side portions each lying in a plane substantially at right angles relative to the front central surface of said central arch portion, said relatively long and slender depending side portions being curved outwardly adjacent the lower ends thereof and being secured adjacent said ends to the lens holding members, the major part of each of said depending portions being located in spaced relation with the adjacent edge surfaces of lenses when in desired associated relation therewith and having relatively narrow edge surfaces disposed in a plane substantially parallel with the front central surface of said central arch portion and a side surface lying in a plane substantially normal to the front central surface of the central arch portion and of a width substantially greater than the width of the edge surfaces, nose pad supporting means secured adjacent the point of attachment of said depending portions to said lens holding members with said nose pad supporting members extending in a direction rearwardly of said depending side portions, said central arch having slotted portions located intermediate the angularly disposed depending side portions and the center of said arch producing bifurcated portions having spaced points of connection with said depending side portions, with one of said points of connection located intermediate the upper and lower ends of said depending side portions.

2. An ophthalmic mounting comprising a pair of lens holding members connected by a bridge member, said bridge member having a central arch portion and relatively long and slender depending side portions all initially formed of sheet-like material, said central arch portion being bowed and having its ends and relatively long and slender depending side portions carried thereby folded forwardly with a single bend to provide integrally angled side portions each lying in a plane substantially at right angles relative to the front central surface of said central arch portion, said relatively long and slender depending side portions being curved outwardly adjacent the lower ends thereof and being secured adjacent said ends to the lens holding members, the major part of each of said depending portions being located in spaced relation with the adjacent edge surfaces of lenses when in desired associated relation therewith and having relatively narrow edge surfaces disposed in a plane substantially parallel with the front central surface of said central arch portion and a side surface lying in a plane substantially normal to the front central surface of the central arch portion and of a width substantially greater than the width of the edge surfaces, nose pad supporting means secured adjacent the point of attachment of said depending portions to said lens holding members with said nose pad supporting members extending in a direction rearwardly of said depending side portions, said central arch having slotted portions located intermediate the angularly disposed depending side portions and the center of said arch producing bifurcated portions having spaced points of connection with said depending side portions, with one of said points of connection located intermediate the upper and lower ends of said depending side portions and the front face of said central arch portion having grooves therein communicating with the slotted end portions.

3. An ophthalmic mounting comprising a pair of lenses, a pair of lens holding members on said lenses connected by a bridge member, said bridge member having a central arch portion and relatively long and slender depending side portions all initially formed of sheet-like material, said central arch portion being bowed and having its ends and relatively long and slender depending side portions folded forwardly with a single bend to provide integrally angled side portions each lying in a plane substantially at right angles relative to the front central surface of said central arch portion, said relatively long and slender depending side portions being curved outwardly adjacent the lower ends thereof and being secured adjacent said ends to the lens holding members, the major part of each of said depending portions being located in spaced relation with the adjacent edge surfaces of lenses and having relatively narrow edge surfaces disposed in a plane substantially parallel with the front central surface of said central arch portion and a side surface lying in a plane substantially normal to the front central surface of the central arch portion and of a width substantially greater than the width of the edge surfaces, nose pad supporting means secured adjacent the point of attachment of said depending portions to said lens holding members with said nose pad supporting members extending in a direction rearwardly of said depending side portions, said central arch having slotted portions located intermediate the angularly disposed depending side portions and the center of said arch producing bifurcated portions having spaced points of connection with said depending side portions, with one of said points of connection located intermediate the upper and lower ends of said depending side portions.

GEORGE E. NERNEY.